(12) United States Patent
Yoon et al.

(10) Patent No.: US 9,255,035 B2
(45) Date of Patent: Feb. 9, 2016

(54) DIELECTRIC CERAMIC COMPOSITION AND MULTILAYER CERAMIC CAPACITOR CONTAINING THE SAME

(71) Applicant: SAMSUNG ELECTRO-MECHANICS CO., LTD., Suwon-Si, Gyeonggi-Do (KR)

(72) Inventors: Seok Hyun Yoon, Suwon-Si (KR); Song Je Jeon, Suwon-Si (KR); Soo Kyong Jo, Suwon-Si (KR); Doo Young Kim, Suwon-Si (KR); Chang Hoon Kim, Suwon-Si (KR)

(73) Assignee: SAMSUNG ELECTRO-MECHANICS CO., LTD., Suwon-Si, Gyeonggi-Do (KR)

( * ) Notice: Subject to any disclaimer, the term of this patent is extended or adjusted under 35 U.S.C. 154(b) by 0 days.

(21) Appl. No.: 14/340,244

(22) Filed: Jul. 24, 2014

(65) Prior Publication Data

US 2015/0299048 A1  Oct. 22, 2015

(30) Foreign Application Priority Data

Apr. 21, 2014  (KR) .................. 10-2014-0047611

(51) Int. Cl.
*C04B 35/468* (2006.01)
*H01G 4/06* (2006.01)
*H01G 4/30* (2006.01)
*H01G 4/12* (2006.01)

(52) U.S. Cl.
CPC .......... *C04B 35/4682* (2013.01); *H01G 4/1227* (2013.01); *H01G 4/30* (2013.01); *C04B 2235/3224* (2013.01); *C04B 2235/3234* (2013.01)

(58) Field of Classification Search
CPC .................. C04B 35/4682; H01G 4/1227
See application file for complete search history.

(56) References Cited

U.S. PATENT DOCUMENTS

| 6,599,855 B2 * | 7/2003 | Naito ............................ 501/139 |
| 6,703,336 B2 * | 3/2004 | Fukuda et al. ................ 501/139 |
| 6,842,329 B2 * | 1/2005 | Feltz et al. ................. 361/321.2 |

(Continued)

FOREIGN PATENT DOCUMENTS

| JP | 2011029583 | * | 2/2011 |
| JP | 2011155124 | * | 8/2011 |
| JP | 2011-210783 A | | 10/2011 |
| KR | 10-2006-0050802 A | | 5/2006 |

(Continued)

OTHER PUBLICATIONS

Kim, J. et al., "Effect of Tm2O3 addition on dielectric property of barium titanate cermaics for MLCCs", Journal of the Korean Crystal Growth and Crystal Technology, vol. 20, No. 1, 2010, pp. 25-29, with English Abstract.

(Continued)

*Primary Examiner* — Karl Group
(74) *Attorney, Agent, or Firm* — McDermott Will & Emery LLP (57) ABSTRACT

A dielectric ceramic composition may include: a base powder represented by BaTiO$_3$ and accessory components. In an XRD measurement of a dielectric material in which the base powder and the accessory components are sintered, when a (1, 1, 0) plane peak of a BaTiO$_3$ crystal phase is converted into 1.00, a secondary phase peak of pyrochlore (RE$_2$Ti$_2$O$_7$) (RE is a rare earth element) at about 30.5 degrees, as compared with the (1, 1, 0) plane peak, is 0.01 or less.

16 Claims, 2 Drawing Sheets

(56) References Cited

U.S. PATENT DOCUMENTS

| | | |
|---|---|---|
| 7,262,146 B2 | 8/2007 | Ito et al. |
| 2007/0142209 A1* | 6/2007 | Ito et al. .................. 501/137 |
| 2007/0284792 A1* | 12/2007 | Yanagida et al. ............ 264/614 |

OTHER PUBLICATIONS

Korean Office Action issued in Korean Application No. 10-2014-0047611 dated Jul. 20, 2015, with English Translation.

* cited by examiner

DIELECTRIC CERAMIC COMPOSITION AND MULTILAYER CERAMIC CAPACITOR CONTAINING THE SAME

CROSS-REFERENCE TO RELATED APPLICATION

This application claims the benefit of Korean Patent Application No. 10-2014-0047611 filed on Apr. 21, 2014, with the Korean Intellectual Property Office, the disclosure of which is incorporated herein by reference.

BACKGROUND

The present disclosure relates to a novel dielectric ceramic composition having guaranteed X8R temperature characteristics and reliability, and a multilayer ceramic capacitor containing the same.

Generally, electronic components using ceramic materials, such as capacitors, inductors, piezoelectric elements, varistors, thermistors, and the like, include a ceramic body formed of a ceramic material, internal electrodes formed in the ceramic body, and external electrodes formed on surfaces of the ceramic body to be connected to the internal electrodes.

Among ceramic electronic components, a multilayer ceramic capacitor includes a plurality of stacked dielectric layers, internal electrodes disposed to face each other with the dielectric layers interposed therebetween, and external electrodes electrically connected to the internal electrodes.

Multilayer ceramic capacitors have been widely used as components for mobile communications devices such as computers, personal digital assistances (PDAs), mobile phones, and the like, due to advantages thereof such as a small size, high capacitance, easiness of mounting, and the like.

A multilayer ceramic capacitor may be generally manufactured by forming dielectric layers and internal electrodes using a paste for an internal electrode and a paste for a dielectric layer by a sheet forming method, a printing method, and the like, stacking the dielectric layers and then performing a co-sintering process.

Dielectric materials used in existing high capacitance multilayer ceramic capacitors, and the like, are ferroelectric materials based on barium titanate ($BaTiO_3$) and have high dielectric constants at room temperature, a relatively small dissipation factor, and excellent insulation resistance.

However, the dielectric materials based on barium titanate ($BaTiO_3$) have limitations in satisfying X8R characteristics, capacitance temperature characteristics ranging up to a temperature of 150° C., and ensuring reliability.

Therefore, a material satisfying X8R characteristics, capacitance temperature characteristics ranging up to a temperature of 150° C. and ensuring reliability is required.

RELATED ART DOCUMENT (Patent Document 1) Korean Patent Laid-Open Publication No. 1999-0075846

SUMMARY

An exemplary embodiment in the present disclosure may provide a novel dielectric ceramic composition having guaranteed X8R temperature characteristics and reliability, and a multilayer ceramic capacitor containing the same.

According to an exemplary embodiment in the present disclosure, a dielectric ceramic composition may include: a base powder represented by $BaTiO_3$ and accessory components, wherein in an XRD measurement of a dielectric material in which the base powder and the accessory components are sintered, when a (1, 1, 0) plane peak of a $BaTiO_3$ crystal phase is converted into 1.00, a secondary phase peak of pyrochlore ($RE_2Ti_2O_7$) (RE is a rare earth element) at about 30.5 degrees, as compared with the (1, 1, 0) plane peak, is 0.01 or less.

According to an exemplary embodiment in the present disclosure, a multilayer ceramic capacitor may include: a ceramic body in which dielectric layers and first and second internal electrodes are alternately stacked; and first and second external electrodes formed on both end portions of the ceramic body and electrically connected to the first and second internal electrodes, respectively, wherein the dielectric layers contain a dielectric ceramic composition containing a base powder represented by $BaTiO_3$ and accessory components, and in an XRD measurement of a dielectric material in which the base powder and the accessory components are sintered, when a (1, 1, 0) plane peak of a $BaTiO_3$ crystal phase is converted into 1.00, a secondary phase peak of pyrochlore ($RE_2Ti_2O_7$) (RE is a rare earth element) at about 30.5 degrees, as compared with the (1, 1, 0) plane peak, is 0.01 or less.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Exemplary embodiments of the present disclosure will now be described in detail with reference to the accompanying drawings.

The disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art.

In the drawings, the shapes and dimensions of elements may be exaggerated for clarity, and the same reference numerals will be used throughout to designate the same or like elements.

The present disclosure is directed to a dielectric ceramic composition, and examples of electronic components containing the dielectric ceramic composition may include a capacitor, an inductor, a piezoelectric element, a varistor, a thermistor, and the like. Hereinafter, a dielectric ceramic composition and a multilayer ceramic capacitor as an example of the electronic components will be described.

The dielectric ceramic composition according to an exemplary embodiment of the present disclosure may contain a base powder represented by $BaTiO_3$ and accessory components, wherein in an XRD measurement of a dielectric material in which the base powder and the accessory components are sintered, when a (1, 1, 0) plane peak of a $BaTiO_3$ crystal phase is converted into 1.00, a secondary phase peak of pyrochlore ($RE_2Ti_2O_7$) (RE is a rare earth element) at about 30.5 degrees, as compared with the (1, 1, 0) plane peak, is 0.01 or less.

The dielectric ceramic composition according to an exemplary embodiment of the present disclosure may satisfy X5R (−55° C. to 85° C.), X7R (−55° C. to 125° C.), and X8R (−55° C. to 150° C.) characteristics defined by Electronic Industries Association (EIA) standard.

In detail, according to an exemplary embodiment of the present disclosure, a dielectric ceramic composition using nickel (Ni) as a material for an internal electrode and capable of being sintered under a reduction atmosphere in which nickel (Ni) is not oxidized at a temperature of 1300° C. or less, may be provided.

In addition, the present disclosure provides a multilayer ceramic capacitor using the dielectric ceramic composition, thereby satisfying the temperature characteristics and implementing excellent reliability.

Figure 1:
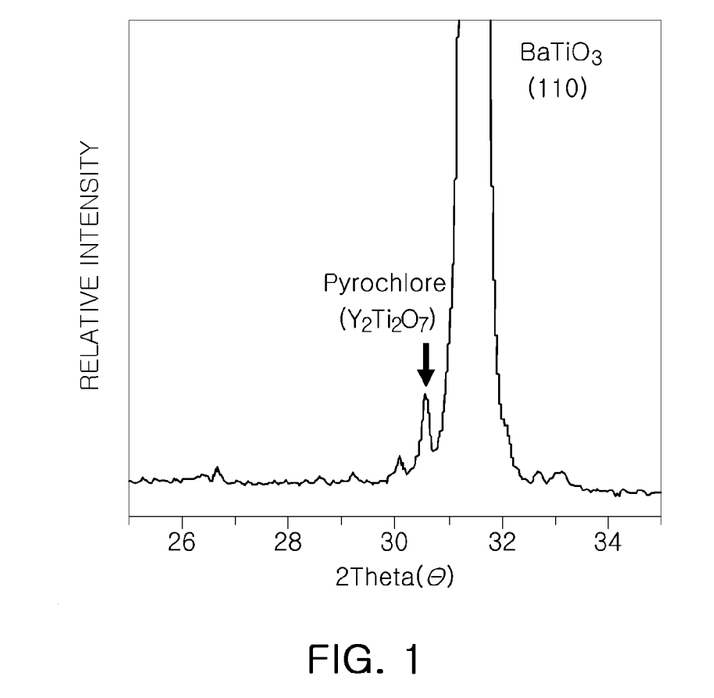
FIG. 1 is a graph illustrating X-ray diffraction (XRD) of a dielectric ceramic composition according to an exemplary embodiment of the present disclosure.

FIG. 1 is a graph illustrating X-ray diffraction (XRD) of a dielectric ceramic composition according to an exemplary embodiment of the present disclosure.

Referring to FIG. 1, in the case of the dielectric ceramic composition according to an exemplary embodiment of the present disclosure, in an XRD measurement of a base powder represented by $BaTiO_3$, when a (1, 1, 0) plane peak of a $BaTiO_3$ crystal phase is converted into 1.00, a secondary phase peak of pyrochlore ($RE_2Ti_2O_7$) (RE is a rare earth element) at about 30.5 degrees, as compared with the (1, 1, 0) plane peak, is 0.01 or less.

In general, $CaZrO_3$ and an excessive amount of rare-earth element are added to $BaTiO_3$ in order to satisfy high temperature characteristics (X8R characteristics). However, in this case, even when the high temperature characteristics may be implemented, since the Curie temperature of the base powder itself is 125° C., there may be limitations in improving temperature coefficient of capacitance (TCC).

In addition, reliability may be reduced since a pyrochlore secondary phase is produced by the addition of an excessive amount of rare-earth element.

However, according to an exemplary embodiment of the present disclosure, the content of the rare-earth element may be adjusted to control secondary phase peak of pyrochlore, and the content of magnesium (Mg) significantly affecting temperature coefficient of capacitance (TCC) characteristics may be adjusted to satisfy high temperature characteristics (X8R characteristics) and to implement excellent TCC characteristics.

Therefore, in the case of a multilayer ceramic capacitor to which the dielectric ceramic composition according to an exemplary embodiment of the present disclosure is applied, high temperature characteristics (X8R characteristics) may be satisfied and excellent temperature coefficient of capacitance (TCC) characteristics may be implemented.

In addition, a value of (Ba+Ca)/Si allowing an appropriate dielectric constant and sinterability to be implemented may be adjusted, such that even in the case of using the base powder represented by $BaTiO_3$, high temperature characteristics (X8R characteristics) may be satisfied.

According to an exemplary embodiment of the present disclosure, in the XRD measurement of the sintered dielectric, when a (1, 1, 0) plane peak of a $BaTiO_3$ crystal phase is converted into 1.00, a secondary phase peak of pyrochlore ($RE_2Ti_2O_7$) (RE is a rare earth element) at about 30.5 degrees as compared with the (1, 1, 0) plane peak may be 0.01 or less, such that deterioration in reliability, caused by the formation of the pyrochlore secondary phase according to the addition of an excessive amount of rare-earth element, may be solved.

The rare-earth element, RE, is not specifically limited, and for example, may be at least one of Y, Dy, Ho, Er, Gd, Ce, Nd, Pm, Eu, Tb, Tm, Yb, Lu and Sm.

In particular, referring to FIG. 1, the pyrochlore secondary phase may be $Y_2Ti_2O_7$.

Hereinafter, respective elements of the dielectric ceramic composition according to an exemplary embodiment of the present disclosure will be described in detail.

a) Base Powder

The dielectric ceramic composition according to an exemplary embodiment of the present disclosure may contain a base powder represented by $BaTiO_3$.

According to an exemplary embodiment of the present disclosure, the base powder may be represented by $BaTiO_3$, but is not limited thereto, and for example, may be represented by $(Ba_{1-x}Ca_x)(Ti_{1-y}Ca_y)O_3$, $(Ba_{1-x}Ca_x)(Ti_{1-y}Zr_y)O_3$, $Ba(Ti_{1-y}Zr_y)O_3$, or the like, in which Ca, Zr, and the like, are partially solid-solubilized.

The base powder may be represented by $BaTiO_3$ having a Curie temperature of around 125° C. which is lower than 150° C. of X8R maximum temperature.

However, as described below, a content of magnesium (Mg), a second accessory component may be adjusted and a content of a rare-earth element, a third accessory component, may be adjusted, such that a room temperature dielectric constant may be significantly high, and X8R (−55° C. to 150° C.) temperature characteristics may be implemented while excellent TCC characteristics may be realized.

That is, the dielectric ceramic composition according to an exemplary embodiment of the present disclosure may guarantee operations under high temperature environments of 150° C.

The dielectric ceramic composition according to an exemplary embodiment of the present disclosure may have a room temperature dielectric constant of 2000 or more.

The base powder may have an average particle size of 1000 nm or less, but is limited thereto.

b) First Accessory Component

According to an exemplary embodiment of the present disclosure, the dielectric ceramic composition may contain an oxide or a carbonate containing at least one of Mn, V, Cr, Fe, Ni, Co, Cu and Zn, as a first accessory component.

As the first accessory component, the oxide or the carbonate containing at least one of Mn, V, Cr, Fe, Ni, Co, Cu and Zn may be contained in a content of 0.1 to 5.0 mol % based on 100 mol % of the base powder.

The first accessory component may serve to decrease a sintering temperature and improve high temperature withstand voltage properties of a multilayer ceramic capacitor to which the dielectric ceramic composition is applied.

The content of the first accessory component and respective contents of second to sixth accessory components to be described below, the contents contained based on 100 mol % of the base powder, respectively, may be defined by mol % of metal ions contained in respective accessory components.

In the case in which a content of the first accessory component is less than 0.1 mol %, a sintering temperature may be increased and high temperature withstand voltage properties may be slightly deteriorated.

In the case in which a content of the first accessory component is 5.0 mol % or more, high temperature withstand voltage properties and room temperature specific resistance may be deteriorated.

In particular, the dielectric ceramic composition according to an exemplary embodiment of the present disclosure may contain the first accessory component having a content of 0.1 to 5.0 mol % based on 100 mol % of the base powder, such that a relatively low temperature sintering process may be performed and excellent high temperature withstand voltage properties may be obtained.

c) Second Accessory Component

According to an exemplary embodiment of the present disclosure, the dielectric ceramic composition may contain a second accessory component, an oxide or a carbonate containing a fixed-valence acceptor element, Mg that enhances sintering density and non-reducibility. Therefore this component is widely used in MLCC dielectric formulation. However, the amount of this component is strictly limited in this invention.

The dielectric ceramic composition may contain 0.2 mol % or less of the second accessory component, an oxide or a carbonate containing a fixed-valence acceptor element, Mg, based on 100 mol % of the base powder.

In the case in which a content of the second accessory component is more than 0.2 mol %, the multilayer ceramic capacitor containing the dielectric ceramic composition may be outside of the X8R (−55° C. to 150° C.) temperature standard.

d) Third Accessory Component

According to an exemplary embodiment of the present disclosure, the dielectric ceramic composition may contain a third accessory component, an oxide or a carbonate containing at least one of Y, Dy, Ho, Er, Gd, Ce, Nd, Pm, Eu, Tb, Tm, Yb, Lu and Sm.

The dielectric ceramic composition may contain 2.0 to 10.0 mol % of a third accessory component, an oxide or a carbonate containing at least one of Y, Dy, Ho, Er, Gd, Ce, Nd, Pm, Eu, Tb, Tm, Yb, Lu and Sm, based on 100 mol % of the base powder.

The third accessory component may serve to prevent deterioration in reliability of a multilayer ceramic capacitor to which the dielectric ceramic composition according to an exemplary embodiment of the present disclosure is applied.

In detail, the content of the third accessory component is adjusted, such that in the XRD measurement of a sintered dielectric, when the (1, 1, 0) plane peak of the $BaTiO_3$ crystal phase is converted into 1.00, the secondary phase peak of pyrochlore ($RE_2Ti_2O_7$) (RE is a rare earth element) at about 30.5 degrees as compared with the (1, 1, 0) plane peak may be 0.01 or less.

In the case in which the content of the third accessory component is less than 2.0 mol %, reliability may be deteriorated.

In the case in which the content of the third accessory component is more than 10.0 mol %, high temperature withstand voltage properties may be deteriorated.

e) Fourth Accessory Component

According to an exemplary embodiment of the present disclosure, the dielectric ceramic composition may contain a fourth accessory component represented by $CaZrO_3$.

The dielectric ceramic composition may contain 1.0 to 10.0 mol % of the fourth accessory component represented by $CaZrO_3$, based on 100 mol % of the base powder.

In an exemplary embodiment of the present disclosure, the fourth accessory component may serve to increase Curie temperature of the dielectric ceramic composition to implement X8R (−55° C. to 150° C.) temperature characteristics.

In the case in which a content of the fourth accessory component is less than 1.0 mol %, a Curie temperature increasing effect may be decreased, such that X8R (−55° C. to 150° C.) temperature characteristics may not be implemented.

In the case in which a content of the fourth accessory component is more than 10.0 mol %, a multilayer ceramic capacitor containing the dielectric ceramic composition may be outside of the X8R (−55° C. to 150° C.) temperature standard.

f) Fifth Accessory Component

According to an exemplary embodiment of the present disclosure, the dielectric ceramic composition may contain a fifth accessory component, an oxide or a carbonate containing at least one of Ba and Ca.

The dielectric ceramic composition may contain 0.25 to 6.0 mol % of the fifth accessory component, an oxide or a carbonate containing at least one of Ba and Ca, based on 100 mol % of the base powder.

In an exemplary embodiment of the present disclosure, the fifth accessory component may serve to increase Curie temperature of the dielectric ceramic composition to implement X8R (−55° C. to 150° C.) temperature characteristics.

In the case in which the content of the fifth accessory component is less than 0.25 mol % or is more than 6.0 mol %, a room temperature dielectric constant may be decreased and high temperature withstand voltage properties may be deteriorated.

g) Sixth Accessory Component

According to an exemplary embodiment of the present disclosure, the dielectric ceramic composition may contain an oxide containing Si or a glass compound containing Si, as a sixth accessory component.

The dielectric ceramic composition may contain 0.5 to 5.4 mol % of the sixth accessory component, an oxide containing Si or a glass compound containing Si, based on 100 mol % of the base powder.

The sixth accessory component may serve to decrease a sintering temperature and improve high temperature withstand voltage properties of a multilayer ceramic capacitor to which the dielectric ceramic composition is applied.

In the case in which the content of the sixth accessory component is less than 0.5 mol % or is more than 5.4 mol % based on 100 mol % of the base powder, a room temperature dielectric constant may be decreased and high temperature withstand voltage properties may be deteriorated.

Figure 2:
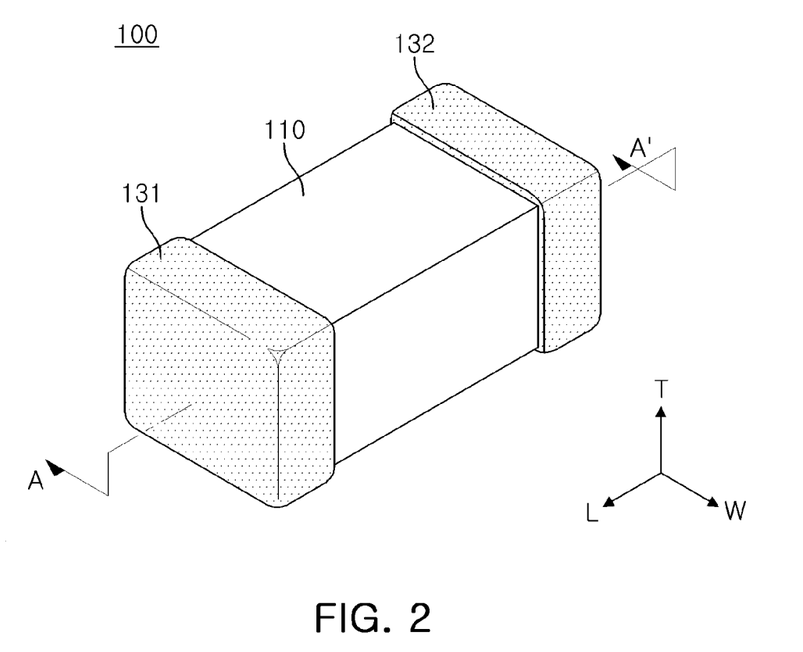
FIG. 2 is a schematic perspective view illustrating a multilayer ceramic capacitor according to an exemplary embodiment of the present disclosure.
Figure 3:
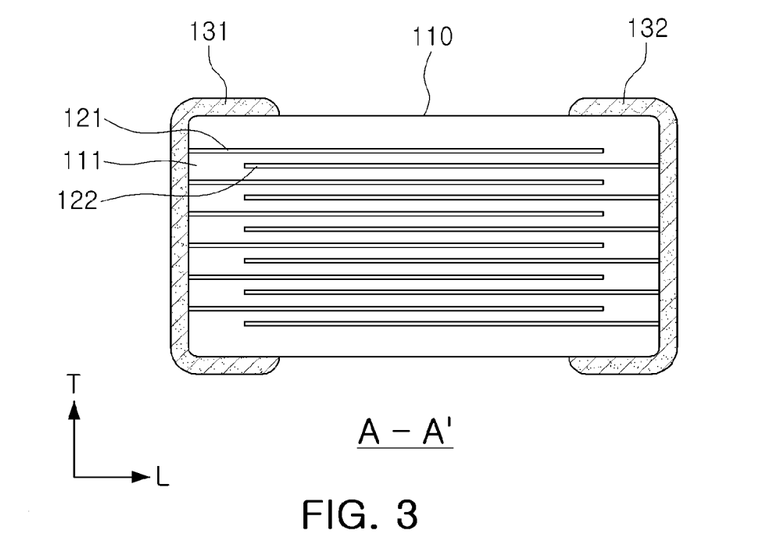
FIG. 3 is a schematic cross-sectional view illustrating the multilayer ceramic capacitor taken along line A-A' of FIG. 2.

FIG. 2 is a schematic perspective view illustrating a multilayer ceramic capacitor 100 according to another exemplary embodiment of the present disclosure, and FIG. 3 is a schematic cross-sectional view illustrating the multilayer ceramic capacitor 100 taken along line A-A' of FIG. 2.

Referring to FIGS. 2 and 3, a multilayer ceramic capacitor 100 according to an exemplary embodiment of the present disclosure may include a ceramic body 110 in which dielectric layers 111 and first and second internal electrodes 121 and 122 are alternately stacked. First and second external electrodes 131 and 132 electrically connected to the first and second internal electrodes 121 and 122 alternately disposed within the ceramic body 110, respectively, may be formed on both end portions of the ceramic body 110.

The ceramic body 110 may generally have a hexahedral shape, but is not limited thereto. In addition, the ceramic body 110 may have a proper size depending on usage thereof, for example, (0.6~5.6 mm)×(0.3~5.0 mm)×(0.3~1.9 mm), but is not limited thereto.

Further, a thickness of the dielectric layer 111 may be arbitrarily changed depending on capacitance design of a capacitor. In an exemplary embodiment of the present disclosure, the dielectric layer may have a thickness of 0.2 μm or more per 1 layer after performing a sintering process.

In a case in which the dielectric layer has an extremely thin thickness, since the number of crystal grains present in a single layer is low to cause a negative effect on reliability, the dielectric layer may have a thickness of 0.2 μm or more.

The first and second internal electrodes 121 and 122 may be stacked so that respective ends thereof are alternately exposed to opposite end surfaces of the ceramic body 110.

The first and second external electrodes 131 and 132 may be formed on both end portions of the ceramic body 110 and be electrically connected to the exposed end surface of the alternately disposed first and second internal electrodes 121 and 122, thereby configuring a circuit of a capacitor.

A conductive material contained in the first and second internal electrodes 121 and 122 is not particularly limited. However, since the dielectric layer according to an exemplary embodiment of the present disclosure contains a mixture or a solid solution in which a paraelectric material is mixed with or solid-solubilized in a ferroelectric material, nickel (Ni) may be used as the conductive material.

Each thickness of the first and second internal electrodes 121 and 122 may be appropriately determined depending on usage thereof, or the like, for example, 0.1 to 5 μm or 0.1 to 2.5 μm, but is not limited thereto.

A conductive material contained in the first and second external electrodes 131 and 132 may be nickel (Ni), copper (Cu), or an alloy thereof, but is not limited thereto.

Each thickness of the first and second external electrodes 131 and 132 may be appropriately determined depending on usage thereof, or the like, for example, 10 to 50 μm, but is not limited thereto.

The dielectric layer 111 configuring the ceramic body 110 may contain the dielectric ceramic composition according to an exemplary embodiment of the present disclosure.

The dielectric ceramic composition may contain a base powder represented by $BaTiO_3$ and accessory components, wherein in an XRD measurement of a dielectric material in which the base powder and the accessory components are sintered, when a (1, 1, 0) plane peak of a $BaTiO_3$ crystal phase is converted into 1.00, a secondary phase peak of pyrochlore ($RE_2Ti_2O_7$) (RE is a rare earth element) at about 30.5 degrees as compared with the (1, 1, 0) plane peak may be 0.01 or less.

Since a detailed description of the dielectric ceramic composition is the same as the above-described features of the dielectric ceramic composition according to an exemplary embodiment of the present disclosure, the detailed description thereof will be omitted herein.

Hereinafter, although the present disclosure will be described in detail through Inventive and Comparative Examples, this description is provided to assist understanding of the present disclosure, and accordingly, a scope of the present disclosure is not limited to the following Inventive Examples.

A raw material powder contained $BaTiO_3$ as a main component was mixed with a dispersant according to respective composition ratios shown in the following Tables 1 and 3, using ethanol and toluene as a solvent, and then, was mixed with a binder, thereby manufacturing ceramic sheets.

Nickel (Ni) internal electrodes were printed on the molded ceramic sheet having a thickness of about 10 μm.

Upper and lower cover layers were manufactured by stacking 25 layers of molded sheets having each thickness of 10 to 13 μm and an active layer was manufactured by stacking 21 layers of sheets having each thickness of about 2.0 μm and internal electrodes printed thereon, thereby manufacturing a bar.

The compressed bar was cut into chips each having a 3216 size (length×width×thickness of 3.2 mm×1.6 mm×1.6 mm), by a cutter.

The obtained chip was plasticized and sintered under a reduction atmosphere (1.0% of $H_2$/99% of $N_2$, $H_2O/H_2/N_2$ atmosphere) at a temperature of 1200 to 1300° C. for 2 hours, and was then subjected to a heat treatment under a nitrogen ($N_2$) atmosphere at a temperature of 1000° C. for 3 hours, for reoxidation.

The sintered chip was subjected to a termination process with a copper (Cu) paste, followed by an electrode firing process, thereby completing external electrodes.

The completed prototype MLCC sample was evaluated in view of capacitance, DF, insulation resistance, TCC, and resistance deterioration behavior, depending on a voltage step increase at a high temperature of 150° C., or the like.

Room temperature capacitance and dielectric loss of the MLCC chip were measured under conditions of 1 kHz and 0.2 V/μm of AC, using an LCR-meter.

A dielectric constant of the MLCC chip was calculated from capacitance, a thickness of the dielectric layer of the MLCC chip, an area of the internal electrodes, and the number of stacked layers.

By taking 10 samples, room temperature insulation resistance (IR) thereof was measured after DC 10 V/μm was applied thereto for 60 seconds.

The TCC depending on temperature was measured in a temperature range from −55° C. to 150° C.

In a high temperature IR voltage-boost test, resistance deterioration behavior thereof was measured by increasing a voltage step by 5 V/μm at 150° C., and 10 minutes was required for respective steps, while resistance values were measured at 5-second intervals.

High temperature withstand voltage was deduced from the high temperature IR voltage-boost test, and the withstand voltage indicates a voltage, IR of which was resistant to a $10^5 \Omega$ or more, when the resistance value was measured by applying a voltage step of 5V/μm of DC to a 3216 sized-chip having a 20-layered dielectric with a thickness of 7 μm after performing a sintering process, at 150° C., for 10 minutes, and then continuously increasing the voltage step.

The presence of secondary phase ($Y_2Ti_2O_7$) of pyrochlore in the dielectric material was confirmed by determining whether or not a peak of the corresponding phase at about 30.5 degrees of diffraction angle (2θ) is present by an analysis of X-ray diffraction (XRD).

The following Tables 1 and 3 show compositions of Experimental Examples (Inventive and Comparative Examples), and Tables 2 and 4 show properties of prototype MLCC chips corresponding to the compositions indicated by Tables 1 and 3.

TABLE 1

| | Number of Moles of Each Additive Per 100 mol of Base Metal Powder $BaTiO_3$ | | | | | | | | | | |
|---|---|---|---|---|---|---|---|---|---|---|---|
| | First Accessory Component | | Second Accessory Component | Third Accessory Component | | Fourth Accessory Component | Fifth Accessory Component | | | | (Ba + Ca)/ |
| EXPERIMENTAL EXAMPLE | $MnO_2$ | $V_2O_5$ | $MgCO_3$ | $Y_2O_3$ | $Dy_2O_3$ | $CaZrO_3$ | $BaCO_3$ | $CaCO_3$ | $SiO_2$ | Si |
| 1 | 0.400 | 0.000 | 0.00 | 0.50 | 0.00 | 3.00 | 1.850 | 0.000 | 2.20 | 0.84 |
| 2 | 0.400 | 0.000 | 0.00 | 1.00 | 0.00 | 3.00 | 1.850 | 0.000 | 2.20 | 0.84 |
| 3 | 0.400 | 0.000 | 0.00 | 1.50 | 0.00 | 3.00 | 1.850 | 0.000 | 2.20 | 0.84 |
| 4 | 0.400 | 0.000 | 0.00 | 2.00 | 0.00 | 3.00 | 1.850 | 0.000 | 2.20 | 0.84 |

TABLE 1-continued

| | Number of Moles of Each Additive Per 100 mol of Base Metal Powder BaTiO₃ | | | | | | | | | | |
|---|---|---|---|---|---|---|---|---|---|---|---|
| | First Accessory Component | | Second Accessory Component | Third Accessory Component | | Fourth Accessory Component | Fifth Accessory Component | | | | (Ba + Ca)/ |
| EXPERIMENTAL EXAMPLE | MnO₂ | V₂O₅ | MgCO₃ | Y₂O₃ | Dy₂O₃ | CaZrO₃ | BaCO₃ | CaCO₃ | SiO₂ | Si |
| 5 | 0.400 | 0.000 | 0.00 | 2.50 | 0.00 | 3.00 | 1.850 | 0.000 | 2.20 | 0.84 |
| 6 | 0.400 | 0.000 | 0 00 | 3.00 | 0.00 | 3.00 | 1.850 | 0.000 | 2.20 | 0 84 |
| 7 | 0.400 | 0.000 | 0.00 | 3.50 | 0.00 | 3.00 | 1.850 | 0.000 | 2.20 | 0.84 |
| 8 | 0.400 | 0.000 | 0.00 | 4.00 | 0.00 | 3.00 | 1.850 | 0.000 | 2.20 | 0.84 |
| 9 | 0.400 | 0.000 | 0.00 | 4.50 | 0.00 | 3.00 | 1.850 | 0.000 | 2.20 | 0.84 |
| 10 | 0.400 | 0.000 | 0.00 | 5.00 | 0.00 | 3.00 | 1:850 | 0.000 | 2.20 | 0.84 |
| 11 | 0.400 | 0.000 | 0.00 | 5.50 | 0.00 | 3.00 | 1.850 | 0.000 | 2.20 | 0.84 |
| 12 | 0.400 | 0.000 | 0.00 | 0.00 | 2.50 | 3.00 | 1.850 | 0.000 | 2.20 | 0.84 |
| 13 | 0.400 | 0.000 | 0.05 | 2.50 | 0.00 | 3.00 | 1.850 | 0.000 | 2.20 | 0.84 |
| 14 | 0.400 | 0.000 | 0.10 | 2.50 | 0.00 | 3.00 | 1.850 | 0.000 | 2.20 | 0.84 |
| 15 | 0.400 | 0.000 | 0.20 | 2.50 | 0.00 | 3.00 | 1.850 | 0.000 | 2.20 | 0.84 |
| 16 | 0.400 | 0.000 | 0.30 | 2.50 | 0.00 | 3.00 | 1.850 | 0.000 | 2.20 | 0.84 |
| 17 | 0.400 | 0.000 | 0.50 | 2.50 | 0.00 | 3.00 | 1.850 | 0.000 | 2.20 | 0.84 |
| 18 | 0.400 | 0.000 | 1.00 | 2.50 | 0.00 | 3.00 | 1.850 | 0.000 | 2.20 | 0.84 |
| 19 | 0.400 | 0.000 | 0.00 | 2.50 | 0.00 | 0.00 | 1.850 | 0.000 | 2.20 | 0.84 |
| 20 | 0 400 | 0.000 | 0.00 | 2.50 | 0.00 | 1.00 | 1.850 | 0.000 | 2.20 | 0.84 |
| 21 | 0.400 | 0.000 | 0.00 | 2.50 | 0.00 | 2.00 | 1.850 | 0.000 | 2.20 | 0.84 |
| 22 | 0.400 | 0.000 | 0.00 | 2.50 | 0.00 | 4.00 | 1.850 | 0.000 | 2.20 | 0.84 |
| 23 | 0.400 | 0.000 | 0.00 | 2.50 | 0.00 | 5.00 | 1.850 | 0.000 | 2.20 | 0.84 |
| 24 | 0 400 | 0.000 | 0.00 | 2.50 | 0.00 | 7.50 | 1.850 | 0.000 | 2.20 | 0.84 |
| 25 | 0.400 | 0.000 | 0.00 | 2.50 | 0.00 | 10.00 | 1.850 | 0.000 | 2.20 | 0.84 |
| 26 | 0.400 | 0.000 | 0.00 | 2.50 | 0.00 | 12.00 | 1.850 | 0.000 | 2.20 | 0.84 |
| 27 | 0.000 | 0.000 | 0.00 | 2.50 | 0.00 | 3.00 | 1.850 | 0.000 | 2.20 | 0.84 |
| 28 | 0.100 | 0.000 | 0.00 | 2.50 | 0.00 | 3.00 | 1.850 | 0.000 | 2.20 | 0.84 |
| 29 | 0 200 | 0.000 | 0.00 | 2.50 | 0.00 | 3.00 | 1.850 | 0.000 | 2.20 | 0.84 |
| 30 | 0.300 | 0.000 | 0.00 | 2.50 | 0.00 | 3.00 | 1.850 | 0.000 | 2.20 | 0.84 |
| 31 | 0.600 | 0.000 | 0.00 | 2.50 | 0.00 | 3.00 | 1.850 | 0.000 | 2.20 | 0.84 |
| 32 | 1.000 | 0.000 | 0.00 | 2.50 | 0.00 | 3.00 | 1.850 | 0.000 | 2.20 | 0.84 |
| 33 | 1.500 | 0.000 | 0.00 | 2.50 | 0.00 | 3.00 | 1.850 | 0.000 | 2.20 | 0.84 |
| 34 | 2.000 | 0.000 | 0.00 | 2.50 | 0.00 | 3.00 | 1.850 | 0.000 | 2.20 | 0.84 |
| 35 | 0.300 | 0.050 | 0.00 | 2.50 | 0.00 | 3.00 | 1.850 | 0.000 | 2.20 | 0.84 |
| 36 | 0.200 | 0.100 | 0.00 | 2.50 | 0.00 | 3.00 | 1.850 | 0.000 | 2.20 | 0.84 |
| 37 | 0.000 | 0.200 | 0.00 | 2.50 | 0.00 | 3.00 | 1.850 | 0.000 | 2.20 | 0.84 |

TABLE 2

Properties of Proto-Type Chip
Dielectric Properties (Dielectric Constant/DF/TCC):
Measured under AC 0.2 V/μm

| EXPERIMENTAL EXAMPLE | Dielectric Constant | DF (%) | RC (WF) | TCC (%) (−55° C.) | TCC (%) (125° C.) | TCC (%) (150° C.) | High Temperature Withstand Voltage (V/μm)* | Whether or Not Pyrochlore Phase (RE₂Ti₂O₇) Is Formed | Property Evaluation ○: Excellent X: Defective Δ: Average |
|---|---|---|---|---|---|---|---|---|---|
| 1 | 4426 | 12.50 | 0.5 | 2.4% | 0.5% | −13.2% | 5 | Not Formed (X) | X |
| 2 | 3217 | 4.60 | 580 | 1.7% | 0.8% | −10.5% | 50 | Not Formed (X) | Δ |
| 3 | 3069 | 3.87 | 780 | 1.5% | 0.5% | −10.2% | 55 | Not Formed (X) | ○ |
| 4 | 2788 | 2.24 | 1012 | 1.6% | 0.7% | −10.4% | 55 | Not Formed (X) | ○ |
| 5 | 2454 | 2.11 | 1082 | 1.5% | 0.8% | −9 9% | 60 | Not Formed (X) | ○ |
| 6 | 2333 | 2.07 | 1113 | 1.7% | 0.4% | −9.5% | 65 | Not Formed (X) | ○ |
| 7 | 2285 | 1.92 | 1132 | 1.5% | 0.5% | −9.4% | 60 | Not Formed (X) | ○ |
| 8 | 2178 | 1.86 | 1224 | 1.6% | 0.4% | −9.5% | 60 | Not Formed (X) | ○ |
| 9 | 2046 | 1.78 | 1217 | 0.8% | 0.5% | −9.8% | 56 | Not Formed (X) | ○ |
| 10 | 1957 | 1.54 | 1343 | 0.5% | 0.1% | −11.2% | 50 | Formed (○) | Δ |
| 11 | 1926 | 1.47 | 1458 | 0.6% | −0.3% | −12.8% | 35 | Formed (○) | X |
| 12 | 2433 | 2.22 | 1082 | 1.5% | 0.8% | −9.9% | 60 | Not Formed (X) | ○ |
| 13 | 2467 | 2.31 | 1127 | 1.4% | −0.8% | −10.3% | 60 | Not Formed (X) | ○ |
| 14 | 2458 | 2.24 | 1211 | 1.4% | −1.2% | −14.5% | 60 | Not Formed (X) | ○ |
| 15 | 2475 | 2.22 | 1545 | 1.5% | −2.5% | −15.0% | 60 | Not Formed (X) | Δ |
| 16 | 2333 | 2.16 | 1762 | 1.6% | −3.7% | −15.5% | 60 | Not Formed (X) | X |
| 17 | 2354 | 2.18 | 1754 | 1.7% | −4.3% | −16.4% | 60 | Not Formed (X) | X |
| 18 | 2276 | 2.11 | 1832 | 1.7% | −5.7% | −17.8% | 60 | Not Formed (X) | X |
| 19 | 2157 | 1.88 | 786 | 1.0% | 3.4% | −21.9% | 50 | Not Formed (X) | X |
| 20 | 2209 | 1.92 | 987 | 1.1% | 2.4% | −15.0% | 55 | Not Formed (X) | Δ |
| 21 | 2433 | 2.22 | 1082 | 1.5% | 1.1% | −12.5% | 60 | Not Formed (X) | ○ |
| 22 | 2425 | 2.25 | 1135 | 1.2% | 0.8% | −10.0% | 60 | Not Formed (X) | ○ |
| 23 | 2433 | 2.37 | 1282 | 0.8% | −1.2% | −12.2% | 60 | Not Formed (X) | ○ |

TABLE 2-continued

Properties of Proto-Type Chip
Dielectric Properties (Dielectric Constant/DF/TCC):
Measured under AC 0.2 V/μm

| EXPERIMENTAL EXAMPLE | Dielectric Constant | DF (%) | RC (WF) | TCC (%) (−55° C.) | TCC (%) (125° C.) | TCC (%) (150° C.) | High Temperature Withstand Voltage (V/μm)* | Whether or Not Pyrochlore Phase ($RE_2Ti_2O_7$) Is Formed | Property Evaluation ○: Excellent X: Defective Δ: Average |
|---|---|---|---|---|---|---|---|---|---|
| 24 | 2312 | 2.16 | 1324 | 0.5% | −2.3% | −13.4% | 60 | Not Formed (X) | ○ |
| 25 | 2278 | 2.07 | 1367 | 0.7% | −3.5% | −14.5% | 60 | Not Formed (X) | ○ |
| 26 | 2154 | 1.85 | 1456 | 0.8% | −4.5% | −15.6% | 60 | Not Formed (X) | X |
| 27 | — | — | 0.2 | — | — | — | 5 | Not Formed (X) | X |
| 28 | 2543 | 4.52 | 1504 | −1.2% | 1.2% | −10.8% | 10 | Not Formed (X) | X |
| 29 | 2511 | 4.12 | 1673 | −0.5% | 1.1% | −11.4% | 50 | Not Formed (X) | ○ |
| 30 | 2467 | 3.55 | 1248 | −0.8% | −0.5% | −10.5% | 55 | Not Formed (X) | ○ |
| 31 | 2376 | 2.99 | 987 | −0.4% | −1.1% | −9.9% | 60 | Not Formed (X) | ○ |
| 32 | 2255 | 2.72 | 885 | 0.7% | −1.5% | −9.6% | 65 | Not Formed (X) | ○ |
| 33 | 2034 | 2.12 | 825 | 1.1% | −1.8% | −10.4% | 70 | Not Formed (X) | ○ |
| 34 | 1986 | 1.78 | 504 | 1.2% | −0.7% | −9.9% | 60 | Not Formed (X) | Δ |
| 35 | 2410 | 2.26 | 1045 | 1.3% | 0.5% | −9.5% | 60 | Not Formed (X) | ○ |
| 36 | 2389 | 2.17 | 967 | 0.8% | 0.8% | −9.9% | 60 | Not Formed (X) | ○ |
| 37 | 2432 | 2.32 | 754 | 1.2% | 2.3% | −6.7% | 60 | Not Formed (X) | ○ |

Table 1 above shows Experimental Examples 1 to 11 depending on a change in a content of the third accessory component, Y, when the sum of the first accessory component (Mn and V) was 0.4 mol, the content of the second accessory component, Mg, was 0 mol, the content of the fourth accessory component, $CaZrO_3$, was 3 mol, the sum of the fifth accessory component (Ba and Ca) was 1.85 mol, the content of the sixth accessory component, Si, was 2.2 mol, and the ratio of the sum of the fifth accessory component to the content of the sixth accessory component, Si, represented by (Ba+Ca)/Si, was 0.84. Table 2 above shows properties of samples corresponding to the Experimental Examples 1 to 11.

All of these Experimental Examples satisfied X8R temperature characteristics. However, when the content of the third accessory component, Y, had an element ratio of 1 mol, significantly low (Comparative Example 1 and Experimental Example 1), a time constant, RC value was low, and high temperature withstand voltage properties was weak, while when the content of Y had an element ratio of 10 mol or more, significantly high (Comparative Examples 10 and 11, and Experimental Examples 10 and 11), high temperature withstand voltage properties were deteriorated due to the production of the secondary phase of pyrochlore ($Y_2Ti_2O_7$).

Therefore, an appropriate content range of the third accessory component, Y, may be 2.0 mol %≤Y≤10.0 mol %.

Experimental Example 12 of Tables 1 and 2 show properties of samples when the third accessory component, Y, was changed into Dy and in this case, as compared with the case to which Y was applied like Experimental Example 5, Experimental Example 12 had a dielectric constant, DF, RC, TCC, and high temperature withstand voltage properties, which are on almost the same level as those of Experimental Example 5.

Therefore, the third accessory component may contain at least one of rare-earth elements.

Experimental Examples 13 to 18 of Tables 1 and 2 show a change in properties depending on a change in a content of the second accessory component, Mg.

The addition of Mg usually enhances sintering density and non-reducibility. It could be appreciated that as the content of Mg was increased, an absolute value of TCC at 150° C. was gradually increased. However, when the content of Mg was up to 0.2 mol, X8R temperature standard may be satisfied, and when the content of Mg was more than 0.3 mol, the multilayer ceramic capacitor containing the dielectric ceramic composition having 0.3 mol or more of Mg was out of the temperature standard, and there was no significant difference in high temperature withstand voltage properties depending on Mg content.

Therefore, an appropriate content range of the second accessory component, Mg, may be Mg≤0.2 mol %.

Experimental Examples 5 and 19 to 26 of Tables 1 and 2 show a change in properties depending on a change in a content of the fourth accessory component, $CaZrO_3$ (CZ).

In the case in which the CZ was not added (Comparative Example 10 and Experimental Example 19), the TCC value at 150° C. did not satisfy X8R standard. As the content of CZ was increased, the TCC value at 150° C. was increased and then, was decreased, and in this case, high temperature withstand voltage properties were on the level of 55 to 60 V/μm, excellent, without a significant difference.

In the case in which the content of CZ was 12 mol based on 100 mol of $BaTiO_3$, an excessive content (Comparative Example 26 and Experimental Example 26), the TCC value at 150° C. was outside of the X8R temperature properties.

Therefore, an appropriate content range of the fourth accessory component, $CaZrO_3$ (CZ), may be 1.0 mol %≤$CaZrO_3$≤10.0 mol %.

Experimental Examples 5 and 27 to 34 of Tables 1 and 2 show a change in properties depending on a change in a content of the first accessory component, Mn.

In the case in which the content of Mn was 0.1 mol % or less (Comparative Examples 27 and 28, and Experimental Examples 27 and 28), reduction-resistant characteristics were not implemented, such that the RC value was significantly low or high temperature withstand voltage was decreased.

As the content of Mn was increased, there was no significant change in the TCC value at 150° C. and high temperature withstand voltage tended to be improved. When the content of Mn was extremely increased (Comparative Example 34 and Experimental Example 34), the RC value was decreased.

Therefore, an appropriate content range of the first accessory component, Mn, may be 0.2 mol %≤Mn≤2.0 mol %.

Experimental Example 5 and 35 to 37 of Tables 1 and 2 show a change in properties depending on a range of Mn and V when the sum of the first accessory component Mn and V was 0.4 mol %.

It could be appreciated that as a portion or all of Mn was changed into V, the RC value tended to be slightly decreased, and there was no significant changes in high temperature withstand voltage and the TCC value at 150° C. and X8R characteristics were satisfied.

Therefore, the first accessory component may contain at least one of Mn, V, and transition metal elements such as Cr, Fe, Co, Ni, Cu and Zn, which are variable valence acceptor elements.

TABLE 3

| | Number of Moles of Each Additive Per 100 mol of Base Metal Powder $BaTiO_3$ | | | | | | | | | |
|---|---|---|---|---|---|---|---|---|---|---|
| EXPERIMENTAL EXAMPLE | First Accessory Component | | Second Accessory Component | Third Accessory Component | | Fourth Accessory Component | Fifth Accessory Component | | | (Ba + Ca)/ Si |
| | $MnO_2$ | $V_2O_5$ | $MgCO_3$ | $Y_2O_3$ | $DY_2O_3$ | $CaZrO_3$ | $BaCO_3$ | $CaCO_3$ | $SiO_2$ | |
| 38 | 0.400 | 0.000 | 0.00 | 2.50 | 0.00 | 3.00 | 1.400 | 0.450 | 2.20 | 0.84 |
| 39 | 0.400 | 0.000 | 0.00 | 2.50 | 0.00 | 3.00 | 0.950 | 0.900 | 2.20 | 0.84 |
| 40 | 0.400 | 0.000 | 0.00 | 2.50 | 0.00 | 3.00 | 0.500 | 1.350 | 2.20 | 0.84 |
| 41 | 0.400 | 0.000 | 0.00 | 2.50 | 0.00 | 3.00 | 0.000 | 1.850 | 2.20 | 0.84 |
| 42 | 0.400 | 0.400 | 0.00 | 2.50 | 0.00 | 3.00 | 0.800 | 0.000 | 2.20 | 0.36 |
| 43 | 0.400 | 0.400 | 0.00 | 2.50 | 0.00 | 3.00 | 1.100 | 0.000 | 2.20 | 0.50 |
| 44 | 0.400 | 0.400 | 0.00 | 2.50 | 0.00 | 3.00 | 1.500 | 0.000 | 2.20 | 0.68 |
| 45 | 0.400 | 0.400 | 0.00 | 2.50 | 0.00 | 3.00 | 2.000 | 0.000 | 2.20 | 0.91 |
| 46 | 0.400 | 0.400 | 0.00 | 2.50 | 0.00 | 3.00 | 2.600 | 0.000 | 2.20 | 1.18 |
| 47 | 0.400 | 0.400 | 0.00 | 2.50 | 0.00 | 3.00 | 2.800 | 0.000 | 2.20 | 1.27 |
| 48 | 0.400 | 0.400 | 0.00 | 2.50 | 0.00 | 3.00 | 0.252 | 0.000 | 0.30 | 0.84 |
| 49 | 0.400 | 0.400 | 0.00 | 2.50 | 0.00 | 3.00 | 0.200 | 0.000 | 0.50 | 0.40 |
| 50 | 0.400 | 0.400 | 0.00 | 2.50 | 0.00 | 3.00 | 0.250 | 0.000 | 0.50 | 0.50 |
| 51 | 0.400 | 0.400 | 0.00 | 2.50 | 0.00 | 3.00 | 0.420 | 0.000 | 0.50 | 0.84 |
| 52 | 0.400 | 0.400 | 0.00 | 2.50 | 0.00 | 3.00 | 0.600 | 0.000 | 0.50 | 1.20 |
| 53 | 0.400 | 0.400 | 0.00 | 2.50 | 0.00 | 3.00 | 0.650 | 0.000 | 0.50 | 1.30 |
| 54 | 0.400 | 0.400 | 0.00 | 2.50 | 0.00 | 3.00 | 0.500 | 0.000 | 1.00 | 0.50 |
| 55 | 0.400 | 0.400 | 0.00 | 2.50 | 0.00 | 3.00 | 0.840 | 0.000 | 1.00 | 0.84 |
| 56 | 0.400 | 0.400 | 0.00 | 2.50 | 0.00 | 3.00 | 1.200 | 0.000 | 1.00 | 1.20 |
| 57 | 0.400 | 0.400 | 0.00 | 2.50 | 0.00 | 3.00 | 1.300 | 0.000 | 1.00 | 1.30 |
| 58 | 0.400 | 0.400 | 0.00 | 2.50 | 0.00 | 3.00 | 1.200 | 0.000 | 3.00 | 0.40 |
| 59 | 0.400 | 0.400 | 0.00 | 2.50 | 0.00 | 3.00 | 1.500 | 0.000 | 3.00 | 0.50 |
| 60 | 0.400 | 0.400 | 0.00 | 2.50 | 0.00 | 3.00 | 2.530 | 0.000 | 3.00 | 0.84 |
| 61 | 0.400 | 0.400 | 0.00 | 2.50 | 0.00 | 3.00 | 3.600 | 0.000 | 3.00 | 1.20 |
| 62 | 0.400 | 0.400 | 0.00 | 2.50 | 0.00 | 3.00 | 4.000 | 0.000 | 3.00 | 1.33 |
| 63 | 0.400 | 0.400 | 0.00 | 2.50 | 0.00 | 3.00 | 2.200 | 0.000 | 5.00 | 0.44 |
| 64 | 0.400 | 0.400 | 0.00 | 2.50 | 0.00 | 3.00 | 2.600 | 0.000 | 5.00 | 0.52 |
| 65 | 0.400 | 0.400 | 0.00 | 2.50 | 0.00 | 3.00 | 4.200 | 0.000 | 5.00 | 0.84 |
| 66 | 0.400 | 0.400 | 0.00 | 2.50 | 0.00 | 3.00 | 6.000 | 0.000 | 5.00 | 1.20 |
| 67 | 0.400 | 0.400 | 0.00 | 2.50 | 0.00 | 3.00 | 6.400 | 0.000 | 5.00 | 1.28 |
| 68 | 0.400 | 0.400 | 0.00 | 2.50 | 0.00 | 3.00 | 5.050 | 0.000 | 6.00 | 0.84 |

TABLE 4

| | Properties of Proto-Type Chip Dielectric Properties (Dielectric Constant/DF/TCC): Measured under AC 0.2 V/μm | | | | | | | Whether | |
|---|---|---|---|---|---|---|---|---|---|
| EXPERIEMENTAL EXAMPLE | Dielectric Constant | DF (%) | RC(WF) | TCC (%) (−55° C.) | TCC (%) (125° C.) | TCC (%) (150° C.) | High Temperature Withstand Voltage (V/μm)* | or Not Pyrochlore Phase ($RE_2Ti_2O_7$) Is Formed | Property Evaluation ○: Excellent X: Defective Δ: Average |
| 38 | 2489 | 2.23 | 1082 | 1.3% | 0.5% | −9.5% | 60 | Not Formed (X) | ○ |
| 39 | 2501 | 2.12 | 1134 | 1.4% | 0.8% | −10.1% | 60 | Not Formed (X) | ○ |
| 40 | 2475 | 2.15 | 1254 | 1.2% | 0.6% | −9.8% | 60 | Not Formed (X) | ○ |
| 41 | 2438 | 2.08 | 1321 | 1.0% | −0.3% | −10.7% | 60 | Not Formed (X) | ○ |
| 42 | 1745 | 1.53 | 1643 | −1.2% | 1.2% | −8.8% | 35 | Not Formed (X) | X |
| 43 | 2005 | 1.78 | 1255 | 1.1% | −0.5% | −10.5% | 50 | Not Formed (X) | Δ |
| 44 | 2138 | 2.03 | 1054 | 0.9% | −0.2% | −10.5% | 55 | Not Formed (X) | ○ |
| 45 | 2432 | 2.36 | 1125 | 0.5% | 0.5% | −10.7% | 60 | Not Formed (X) | ○ |
| 46 | 2155 | 2.11 | 1082 | 1.3% | 0.3% | −9.9% | 60 | Not Formed (X) | ○ |
| 47 | 1897 | 1.64 | 1234 | −3.2% | 2.3% | −10.8% | 40 | Not Formed (X) | X |
| 48 | 1789 | 1.64 | 1326 | −0.9% | 0.5% | −10.0 % | 40 | Not Formed (X) | X |
| 49 | 1888 | 1.76 | 1212 | −1.6% | 0.8% | −12.5% | 35 | Not Formed (X) | X |
| 50 | 2047 | 1.88 | 1174 | 0.7% | −1.2% | −10.5% | 50 | Not Formed (X) | Δ |
| 51 | 2356 | 2.08 | 1024 | −1.3% | 0 5% | −9.9% | 60 | Not Formed (X) | ○ |
| 52 | 2287 | 2.34 | 1123 | −0.8% | 0.5% | −10.6% | 55 | Not Formed (X) | ○ |

TABLE 4-continued

Properties of Proto-Type Chip
Dielectric Properties (Dielectric Constant/DF/TCC):
Measured under AC 0.2 V/μm

| EXPERIEMENTAL EXAMPLE | Dielectric Constant | DF (%) | RC(WF) | TCC (%) (−55° C.) | TCC (%) (125° C.) | TCC (%) (150° C.) | High Temperature Withstand Voltage (V/μm)* | Whether or Not Pyrochlore Phase (RE$_2$Ti$_2$O$_7$) Is Formed | Property Evaluation ○: Excellent X: Defective △: Average |
|---|---|---|---|---|---|---|---|---|---|
| 53 | 1976 | 1.86 | 1217 | 0.6% | −0.5% | −9.9% | 45 | Not Formed (X) | X |
| 54 | 2108 | 1.85 | 1174 | 0.5% | −1.4% | −10.2% | 50 | Not Formed (X) | ○ |
| 55 | 2347 | 2.11 | 1005 | 0.9% | −1.7% | −10.5% | 60 | Not Formed (X) | ○ |
| 56 | 2156 | 2.08 | 1143 | 1.1% | −1.5% | −10.6% | 55 | Not Formed (X) | ○ |
| 57 | 1988 | 1.94 | 1245 | 1.2% | −1.2% | −11.5% | 45 | Not Formed (X) | X |
| 58 | 1854 | 1.68 | 1123 | −1.7% | −1.1% | −12.7% | 40 | Not Formed (X) | X |
| 59 | 2006 | 1.80 | 1078 | −1.9% | −1.2% | −11.9% | 50 | Not Formed (X) | ○ |
| 60 | 2265 | 2.05 | 1037 | −2.0% | −1.4% | −11.5% | 60 | Not Formed (X) | ○ |
| 61 | 2156 | 2.14 | 1085 | −2.2% | −1.3% | −12.2% | 60 | Not Formed (X) | ○ |
| 62 | 1789 | 1.78 | 1109 | −1.9% | −0.8% | −11.4% | 45 | Not Formed (X) | X |
| 63 | 1932 | 1.65 | 1034 | −2.3% | −1.7% | −13.4% | 40 | Not Formed (X) | X |
| 64 | 1998 | 1.76 | 1023 | −2.4% | −1.8% | −13.2% | 50 | Not Formed (X) | ○ |
| 65 | 2208 | 2.02 | 1006 | −2.2% | −1.8% | −13.6% | 55 | Not Formed (X) | ○ |
| 66 | 2123 | 2.03 | 995 | −2.6% | −1.4% | −13.4% | 55 | Not Formed (X) | ○ |
| 67 | 1755 | 1.77 | 893 | −2.5% | −1.9% | −13.0% | 45 | Not Formed (X) | X |
| 68 | 1997 | 1.83 | 933 | −1.7% | −1.6% | −12.6% | 45 | Not Formed (X) | X |

Experimental Examples 38 to 41 of Tables 3 and 4 show a change in properties when a portion or all of the fifth accessory component, Ba, was changed into Ca in the composition of Experimental Example 5.

When compared to the sample of Experimental Example 5, Experimental Examples 38 to 41 exhibited a dielectric constant, DF, RC, TCC, and high temperature withstand voltage properties, which are on almost the same level as those of Experimental Example 5.

Therefore, the fifth accessory component may contain at least one of Ba and Ca.

Experimental Examples 42 to 47 of Tables 3 and 4 show a change in the content of fifth accessory component, Ba, and a correspondingly generated change in properties depending on (Ba+Ca)/Si, when the content of the sixth accessory component, SiO$_2$, was 2.2 mol, in the composition of Experimental Example 5.

In the case in which (Ba+Ca)/Si was 0.36, small (Comparative Example 42 and Experimental Example 42), the dielectric constant was 2000 or less, significantly low, and the high temperature withstand voltage properties were on the low level of 35 V/μm.

As the content of Ba and the value of the (Ba+Ca)/Si were increased, the dielectric constant was increased, and the high temperature withstand voltage properties were increased. However, when the content of Ba and the value of (Ba+Ca)/Si were excessively large (Comparative Example 47 and Experimental Example 47), the dielectric constant was decreased to 2000 or less, and the high temperature withstand voltage was decreased to 40 V/μm.

Therefore, it could be appreciated that when a content of Si was 2.2 mol % in the composition of Experimental Example 5, an appropriate value of (Ba+Ca)/Si was 0.5 to 1.2, and an appropriate range of the fifth accessory component (Ba+Ca) was 1.1 to 2.64 mol %.

In Experimental Example 48 of Tables 3 and 4, the value of (Ba+Ca)/Si was 0.84, the same value as that of Experimental Example 5, and the content of (Ba+Ca) and the content of Si were decreased to 0.252 and 0.3, respectively.

As described above, in the case in which the content of Si was 0.3, low, even when the value of (Ba+Ca)/Si was within an appropriate range, the dielectric constant was 1789, small, and the high temperature withstand voltage was 40 V/μm, low.

Experimental Examples 49 to 53 show a change in the content of the fifth accessory component, Ba, and a correspondingly generated change in properties depending on (Ba+Ca)/Si, when the content of the sixth accessory component, SiO$_2$, was 0.5 mol, in the composition of Experimental Example 5.

In the case in which the (Ba+Ca)/Si was 0.4, extremely small (Comparative Example 49 and Experimental Example 49), or the (Ba+Ca)/Si was 1.3, extremely large (Comparative Example 53 and Experimental Example 53), the dielectric constant was on the low level of 2000 or less, and high temperature withstand voltage was on the low level of 45 V/μm or less.

Therefore, it could be appreciated that when a content of Si in the composition of Experimental Example 5 was 0.5 mol %, an appropriate value of (Ba+Ca)/Si was 0.5 to 1.2, and an appropriate range of the fifth accessory component (Ba+Ca) was 0.25 to 0.6 mol %.

Experimental Examples 54 to 57, 58 to 62, and 63 to 67 show a change in the content of Ba, and a correspondingly generated change in properties depending on (Ba+Ca)/Si, when respective contents of SiO$_2$, were 1.0 mol, 3.0 mol, and 5.0 mol.

In the case of the above-mentioned three contents of SiO$_2$, under Ba-containing conditions in which the value of (Ba+Ca)/Si was less than 0.5 or was more than 1.2 (Comparative Examples 58, 62, 63 and 67, and Experimental Examples 58, 62, 63 and 67), the dielectric constant was on the low level of 2000 or less, and the high temperature withstand voltage was on the low level of 45 V/μm or less.

Therefore, in these Experimental Examples, an appropriate range of (Ba+Ca)/Si may satisfy 0.5≤(Ba+Ca)/Si≤1.2.

In Experimental Example 68, the value of (Ba+Ca)/Si was 0.84, the same value as that of Experimental Example 5, and the content of (Ba+Ca) and the content of Si were excessive, 5.05 and 6.00, respectively.

As described above, in the case in which the content of Si was 6.00, excessive, even when the value of (Ba+Ca)/Si was within an appropriate range, the dielectric constant was on the low level of 2000 or less, and the high temperature withstand voltage was on the low level of 45 V/μm or less.

Therefore, in consideration of the appropriate ranges of the fifth accessory component and the sixth accessory component together, it could be appreciated from the results of Experimental Examples 42 to 68 that the content range of the fifth accessory component (Ba+Ca), satisfied 0.25 mol % (Ba+Ca) ≤6.0 mol %, the content range of the sixth accessory component, Si, satisfied 0.5 mol %≤Si≤5.0 mol %, and the content ratio of (Ba+Ca)/Si satisfied 0.5≤(Ba+Ca)/Si≤1.2.

As set forth above, according to exemplary embodiments of the present disclosure, the dielectric ceramic composition capable of satisfying X8R temperature characteristics and having excellent high temperature withstand voltage properties, and the multilayer ceramic capacitor containing the same, may be provided.

In addition, relative intensity of a pyrochlore secondary phase may be adjusted, such that the dielectric ceramic composition having excellent reliability, and the multilayer ceramic capacitor containing the same, may be provided.

While exemplary embodiments have been shown and described above, it will be apparent to those skilled in the art that modifications and variations could be made without departing from the spirit and scope of the present disclosure as defined by the appended claims.

What is claimed is:

1. A dielectric ceramic composition comprising:
a base powder represented by $BaTiO_3$ and accessory components,
wherein in an XRD measurement of a dielectric material in which the base powder and the accessory components are sintered, when a (1,1,0) plane peak of a $BaTiO_3$ crystal phase is converted into 1.00, a secondary phase peak of pyrochlore ($RE_2Ti_2O_7$) (RE is a rare earth element) at about 30.5 degrees, as compared with the (1,1,0) plane peak, is less than 0.01.

2. The dielectric ceramic composition of claim 1, wherein the dielectric ceramic composition contains 0.2 to 2.0 mol % of a first accessory component, an oxide or a carbonate containing at least one of Mn, V, Cr, Fe, Ni, Co, Cu and Zn, based on 100 mol % of the base powder.

3. The dielectric ceramic composition of claim 1, wherein the dielectric ceramic composition contains 0.2 mol % or less of a second accessory component, an oxide or a carbonate containing a fixed-valence acceptor element, Mg, based on 100 mol % of the base powder.

4. The dielectric ceramic composition of claim 1, wherein the dielectric ceramic composition contains 2.0 to 10.0 mol % of a third accessory component, an oxide or a carbonate containing at least one of Y, Dy, Ho, Er, Gd, Ce, Nd, Pm, Eu, Tb, Tm, Yb, Lu and Sm, based on 100 mol % of the base powder.

5. The dielectric ceramic composition of claim 1, wherein the dielectric ceramic composition contains 1.0 to 10.0 mol % of a fourth accessory component, $CaZrO_3$, based on 100 mol % of the base powder.

6. The dielectric ceramic composition of claim 1, wherein the dielectric ceramic composition contains 0.25 to 6.0 mol % of a fifth accessory component, an oxide or a carbonate containing at least one of Ba and Ca, based on 100 mol % of the base powder.

7. The dielectric ceramic composition of claim 1, wherein the dielectric ceramic composition contains 0.5 to 5.4 mol % of a sixth accessory component, an oxide containing Si or a glass compound containing Si, based on 100 mol % of the base powder.

8. The dielectric ceramic composition of claim 1, wherein the dielectric ceramic composition contains 0.25 to 6.0 mol % of a fifth accessory component, an oxide or a carbonate containing Ba and Ca, and 0.5 to 5.4 mol % of a sixth accessory component, at least one of an oxide containing Si and a glass compound containing Si, based on 100 mol % of the base powder, and a content ratio of the fifth accessory component to the sixth accessory component satisfies 0.5≤(Ba+Ca)/Si≤1.2.

9. A multilayer ceramic capacitor comprising:
a ceramic body in which dielectric layers and first and second internal electrodes are alternately stacked; and
first and second external electrodes formed on both end portions of the ceramic body and electrically connected to the first and second internal electrodes, respectively,
wherein the dielectric layers contain a dielectric ceramic composition containing a base powder represented by $BaTiO_3$ and accessory components, and in an XRD measurement of a dielectric material in which the base powder and the accessory components are sintered, when a (1,1,0) plane peak of a $BaTiO_3$ crystal phase is converted into 1.00, a secondary phase peak of pyrochlore ($RE_2Ti_2O_7$) (RE is a rare earth element) at about 30.5 degrees, as compared with the (1,1,0) plane peak, is less than 0.01.

10. The multilayer ceramic capacitor of claim 9, wherein the dielectric ceramic composition contains 0.2 to 2.0 mol % of a first accessory component, an oxide or a carbonate containing at least one of Mn, V, Cr, Fe, Ni, Co, Cu and Zn, based on 100 mol % of the base powder.

11. The multilayer ceramic capacitor of claim 9, wherein the dielectric ceramic composition contains 0.2 mol % or less of a second accessory component, an oxide or a carbonate containing a fixed-valence acceptor element, Mg, based on 100 mol % of the base powder.

12. The multilayer ceramic capacitor of claim 9, wherein the dielectric ceramic composition contains 2.0 to 10.0 mol % of a third accessory component, an oxide or a carbonate containing at least one of Y, Dy, Ho, Er, Gd, Ce, Nd, Pm, Eu, Tb, Tm, Yb, Lu and Sm, based on 100 mol % of the base powder.

13. The multilayer ceramic capacitor of claim 9, wherein the dielectric ceramic composition contains 1.0 to 10.0 mol % of a fourth accessory component, $CaZrO_3$, based on 100 mol % of the base powder.

14. The multilayer ceramic capacitor of claim 9, wherein the dielectric ceramic composition contains 0.25 to 6.0 mol % of a fifth accessory component, an oxide or a carbonate containing at least one of Ba and Ca, based on 100 mol % of the base powder.

15. The multilayer ceramic capacitor of claim 9, wherein the dielectric ceramic composition contains 0.5 to 5.4 mol % of a sixth accessory component, an oxide containing Si or a glass compound containing Si, based on 100 mol % of the base powder.

16. The multilayer ceramic capacitor of claim 9, wherein the dielectric ceramic composition contains 0.25 to 6.0 mol % of a fifth accessory component, an oxide or a carbonate containing Ba and Ca, and 0.5 to 5.4 mol % of a sixth accessory component, at least one of an oxide containing Si and a glass compound containing Si, based on 100 mol % of the base powder, and a content ratio of the fifth accessory component to the sixth accessory component satisfies 0.5≤(Ba+Ca)/Si≤1.2.

* * * * *